(12) United States Patent
Goyal et al.

(10) Patent No.: US 10,929,909 B2
(45) Date of Patent: Feb. 23, 2021

(54) MEDIA ENHANCEMENT WITH CUSTOMIZED ADD-ON CONTENT

(71) Applicant: International Business Machines Corporation, Armonk, NY (US)

(72) Inventors: Munish Goyal, Yorktown Heights, NY (US); Ramasuri Narayanam, Andhra Pradesh (IN); Krishnasuri Narayanam, Bangalore (IN); Raphael Ezry, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/135,207

(22) Filed: Sep. 19, 2018

(65) Prior Publication Data
US 2020/0090246 A1    Mar. 19, 2020

(51) Int. Cl.
| | |
|---|---|
| *G06Q 30/00* | (2012.01) |
| *G06Q 30/06* | (2012.01) |
| *G06N 3/08* | (2006.01) |
| *G06K 9/00* | (2006.01) |
| *G06K 9/62* | (2006.01) |
| *G06F 16/74* | (2019.01) |
| *G06F 16/783* | (2019.01) |

(52) U.S. Cl.
CPC ....... *G06Q 30/0627* (2013.01); *G06F 16/748* (2019.01); *G06F 16/7837* (2019.01); *G06K 9/00718* (2013.01); *G06K 9/6223* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 7,027,101 B1 | 4/2006 | Sloo et al. | |
| 8,180,667 B1 | 5/2012 | Baluja et al. | |
| 9,066,130 B1 | 6/2015 | Buron et al. | |
| 9,467,750 B2 * | 10/2016 | Banica | H04N 21/812 |
| 2012/0084812 A1 | 4/2012 | Thompson et al. | |
| 2015/0143410 A1 | 5/2015 | Byers | |
| 2017/0180827 A1 | 6/2017 | Lewis et al. | |
| 2017/0193581 A1 * | 7/2017 | Vasthimal | G06F 16/24578 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Mila Airapetian
(74) *Attorney, Agent, or Firm* — James Nock, Esq.; Hye Jin Lucy Song, Esq.; Heslin Rothenberg Farley & Mesiti P.C.

(57) ABSTRACT

Methods, computer program products, and systems are presented. The methods include, for instance: obtaining a product video representing a product and review feeds authored by a user. Product features are extracted from the product video and user specific features are extracted from the review feeds. User specific add-on content is generated based on the user specific features and user data. The user specific add-on contents are overlaid onto the product video when the product feature corresponding to a user specific feature of the user specific add-on content.

20 Claims, 7 Drawing Sheets

(56) References Cited

U.S. PATENT DOCUMENTS

2017/0301001 A1 10/2017 Wilkinson et al.
2020/0286519 A1* 9/2020 Latulipe ............... G11B 27/002

OTHER PUBLICATIONS

Popescu et al., "Extracting Product Features and Opinions from Reviews" Proceedings of Human Language Technology Conference and Conference on Empirical Methods in Natural Language Processing, pp. 339-346, Vancouver, B.C., Canada, Oct. 2005.

Tak-Lam Wong et al., "An Unsupervised Framework for Extracting and Normalizing Product Attributes from Multiple Web Sites", ACM SIGIR 2008, Singapore, Jul. 20-24, 2008, 8 pages.

Ning Chen et al., "AR-Miner: Mining Information Reviews for Developers from Mobile App Marketplace", ICSE 2014: 36th Int'l Conf. on Software Engineering: Proceedings: May 31-Jun. 7, 2014, Hyderabad, India, pp. 767-778.

Kai Sheng Tai et al., "Improved Semantic Representations From Tree-Structured Long Short-Term Memory Networks", Proceedings of the 53rd Annual Meeting of the Association for Computational Linguistics and the 7th International Joint Conference on Natural Language Processing, pp. 1556-1566, Beijing, China, Jul. 26-31, 2015.

* cited by examiner

MEDIA ENHANCEMENT WITH CUSTOMIZED ADD-ON CONTENT

TECHNICAL FIELD

The present disclosure relates to cognitive analytics, data mining, and data classification, and more particularly to methods, computer program products, and systems for enhancing product videos for a user based on observed preference.

BACKGROUND

Many products are presented as a video stream in media sharing sites for various purposes such as launching announcement, commercial promotion, or to provide in-depth information to users. Users accessing such media sharing sites interact with video streams by commenting on various features of the products, by rating the video, and/or by voting on, rating, and replying to certain comments.

SUMMARY

The shortcomings of the prior art are overcome, and additional advantages are provided, through the provision, in one aspect, of a method. The method for automatically augmenting a product video includes, for instance: obtaining, by one or more processor, the product video representing a product and one or more review feed authored by a user, where the user is watching the product video; generating, by the one or more processor, a list of product features presented in the product video; creating, by the one or more processor, a user specific feature map of features addressed in the one or more review feed; producing, by the one or more processor, user specific add-on content corresponding to respective user specific features based on one or more user profile of the user; determining, by the one or more processor, a time to overlay a first user specific add-on content on the product video according to a user specific feature corresponding to the first user specific add-on content, where the user specific feature is mapped to a product feature in the list of product features; and presenting, by the one or more processor, an augmented product video to the user by overlaying the first user specific add-on content on the product video at the determined time.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
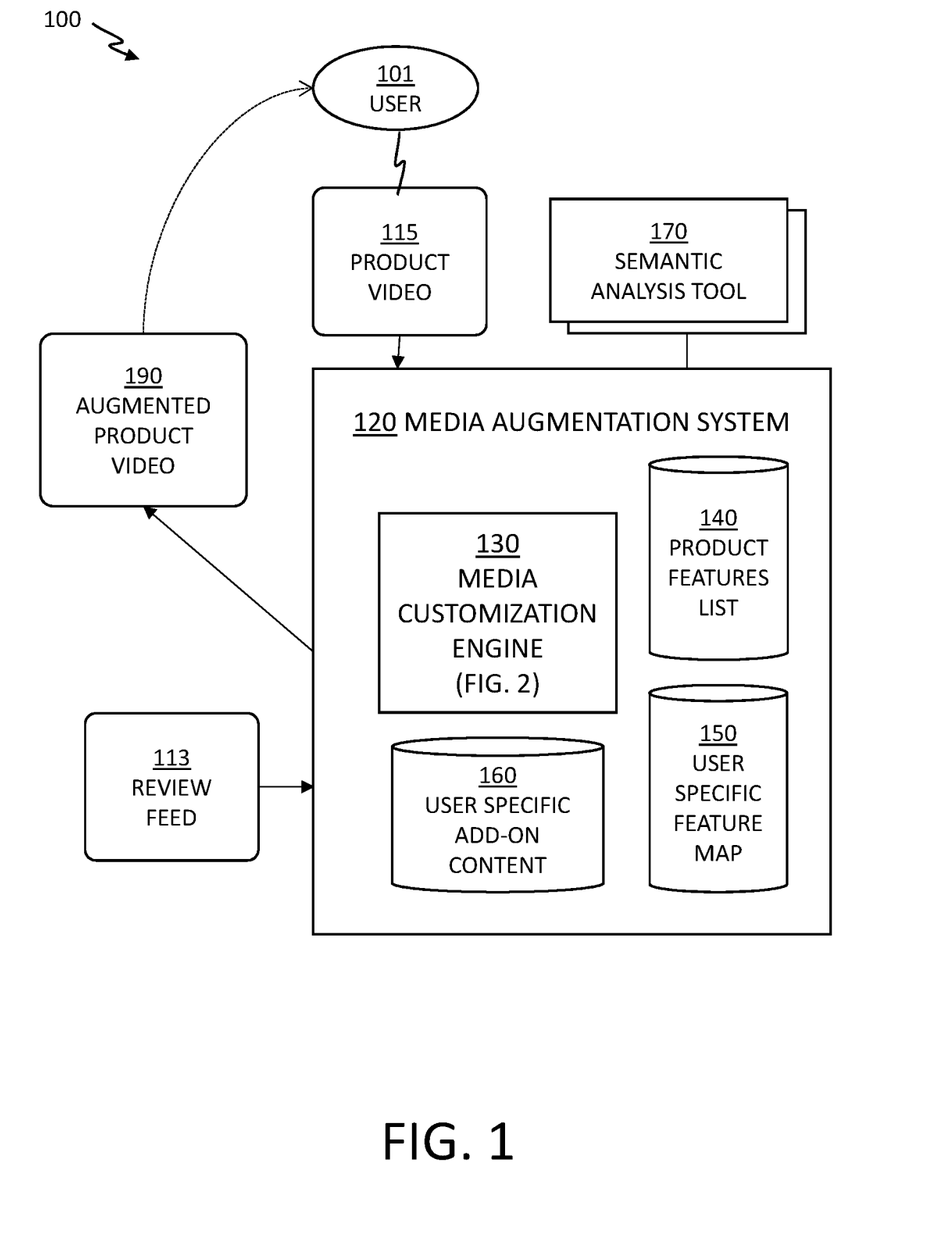
FIG. 1 depicts a system for automatically augmenting a video with user-specific information, in accordance with one or more embodiments set forth herein.

FIG. 1 depicts a system 100 for automatically augmenting a video with add-on content personalized for a user 101, in accordance with one or more embodiments set forth herein.

Embodiments of the present invention acknowledges that product videos promoting various products are posted to various discussion boards/websites on the Internet. These product videos are, for example, played upon click by users, pushed to the users upon opening a certain webpage and/or upon accessing a certain application, particularly for mobile applications. Lately along with the expansion of traffic on the Internet, such online marketing utilizing such product videos performs a significant role in the entire marketing as significant as, if not more, television commercials in publicizing and promoting the products.

Embodiments of the present invention also acknowledges that, due to the interactive nature of online discussion boards/web sites, users who have any opinion on products and/or product features freely post their comments and/or ask questions in any online space, which can be shared with and responded by other users. Accordingly, additional information that is not originally included in the product videos can be developed quickly and become publicly available as soon as the product videos are put in circulation.

The system 100 includes a media augmentation system 120 that enhances a product video 115 on a certain product and generates an augmented product video 190. The media augmentation system 120 takes inputs of a review feed 113 on the same product as the product video 115. The review feed 113 had been provided by the user 101 and made available for the media augmentation system 120. The review feed 113 addresses some features relevant to the product video 115, as the user 101 provided a review for a product, posted a comment on social media or any other digitized public forum. In this specification, the term "review feed" indicates various types of input offered by the user 101 on the product and/or features of the product represented in the product video 115, including user comments, survey feedback, ratings, and/or votes, available from a plurality of discussion boards/websites, as addressed by users in general, if not of particular interest to the user 101.

The media augmentation system 120 includes a media customization engine 130. The media customization engine 130 extracts features of the product video 115 and generates a list of product features 140 from the product video 115. The media customization engine 130 analyzes the review feed 113 created by the user 101 and maps features addressed in the review feed 113 to corresponding features presented in the product video 113. The media customization engine 130 generates a list of user specific feature map 150 as a result of mapping of the features from the product video 115 and the review feed 113.

The media augmentation system 120 compiles user specific add-on content 160 based on data including, but not limited to, a user profile as provided by the user 101 for registering with services provided by the media augmentation system 120, other profile data mined on the user 101, and/or the review feed 113 authored by the user 101.

The user specific add-on content 160 includes, for example, any crowdsourced data publicly available for deriving any comparable, complementary, and/or substitute products for the product presented in the product video 115, such as product reviews, and trend in consumer preference in the market for similar and/or relevant products from social media contents, discussion forum threads, other web materials applicable for the user 101. The user specific add-on content 160 includes, for another example, user preferences on product type and features, purchase pattern, and/or spending habits of the user 101 based on the user profile for the media augmentation service, and/or any other relevant user information as provided. According to the purchase pattern from the user specific add-on content 160, the user 101 may be associated with respective preconfigured groups of products and features to add on to the product video 115 for the user 101, the preconfigured groups, including, but not limited to, early adapter products and/or features, high-end products and/or features, mid-range products and/or features, budget products and/or features, or the like.

The media augmentation system 120 is coupled to one or more semantic analysis tool 170 for analyzing audio/text of the review feed 113 as well as the product video 115. The media augmentation system 120 generates the augmented product video 190, in which additional information on features and/or products specific for the user 101 in relation with the product presented in the product video 115 is overlaid on the product video 115, when the product video 115 plays corresponding features of the product. In order to effectively deliver such additional information, the media augmentation system 120 determines a specific point of time in the product video 115 when to deliver the additional information for the user 101, by overlaying the additional information on the product video 115.

The additional information in the augmented product video 190 may include, but not limited to, details on features preferable by the user 101, details on features addressing issues criticized by the user 101, links and images of comparable, complementary, and/or substitute products for the user 101, as determined by the media augmentation system 120 based on the product features list 140, the user specific feature map 150, and the user specific add-on content 160. For example, when the product video 115 plays the part regarding affordability of the product, the augmented product video 190 is overlaid with complementary/substitute products in price ranges preferred by the user 101. For another example, when the product video 115 plays the part on a new feature that improves a previous issue that had been unfavorably commented by the user 101, the augmented product video 190 is overlaid with a text box for more details on the improvement, a link to follow for more information on the improvement, text/ticker of reviews from other users on the improvement, and/or comparable/substitute products that has different approach from the product of the product video 115. For still another example, when the product video 115 plays the part on another new feature that the user 101 had previously addressed, the augmented product video 190 is overlaid with a text box for more details of the favored new feature, a link to follow for more information on the favored new feature, text/ticker of reviews from other users on the favored new feature, and/or complementary/substitute products that also have the favored new feature.

An example of the review feed 113 on a high-end smartphone product Model X by Brand A is as follows:

It's certainly good that Brand A company brought back the expandable storage via the microSD slot because it was obnoxious for them to ask for $200 more for the larger capacity phone last year when you could have bought your own extra storage for $30. The Model X still doesn't have the removable battery which is a problem for me as I like to keep phones for a few years. Batteries only last a year or two before they start to show a noticeable reduction in performance. I like being able to get the $20 replacement battery, pop it in and be on my way. And while Model X phones is a great phone otherwise in every category, there are budget phones now that are starting to get pretty darn good for around $200 to $300. They aren't as good as Model X phones, but they are as good as the S4. So they are 2-3 years behind, but the phone tech from 4 years ago was pretty good for the average user. I was ready to buy a Model X phone. I had it in my hand at the P wireless carrier and just decided to go with a lower cost phone. The Model X phone is awesome, but I couldn't justify the price tag. The Model X phone earns its value for 2 types of phone users though. People who want a really good camera in their pocket at all times and people who like to play high end graphical video games. If you are one of those people, then this might be a good value at $700 for you. If you just want to make calls, text your friends, take the occasional picture, and play a couple fairly simple games, you might consider one of the more budget friendly phones by companies that were considered off brands 3 years ago but who now are making very quality phones. (Brand B and Brand C come to mind . . . . )

The exemplary review feed above is analyzed for the features favored by the user 101 such as the microSD slot for expandable storage, features criticized by the user 101 such as lack of removable battery and low cost effectiveness as presented in the statement that "I couldn't justify the price tag", and complementary/substitute products, by the semantic analysis tool 170 that analyzes text of the review feed and classifies commented features into predefined classes and associated with positive or negative responses by the user 101, as represented by a certain range of values corresponding to the respective features. The complementary/substitute products may be, for example, similar smartphone with a removable battery or a better battery that would perform consistently over "a few years", as well as the budge phones with reasonable quality from Brand B and Brand C.

Figure 2:
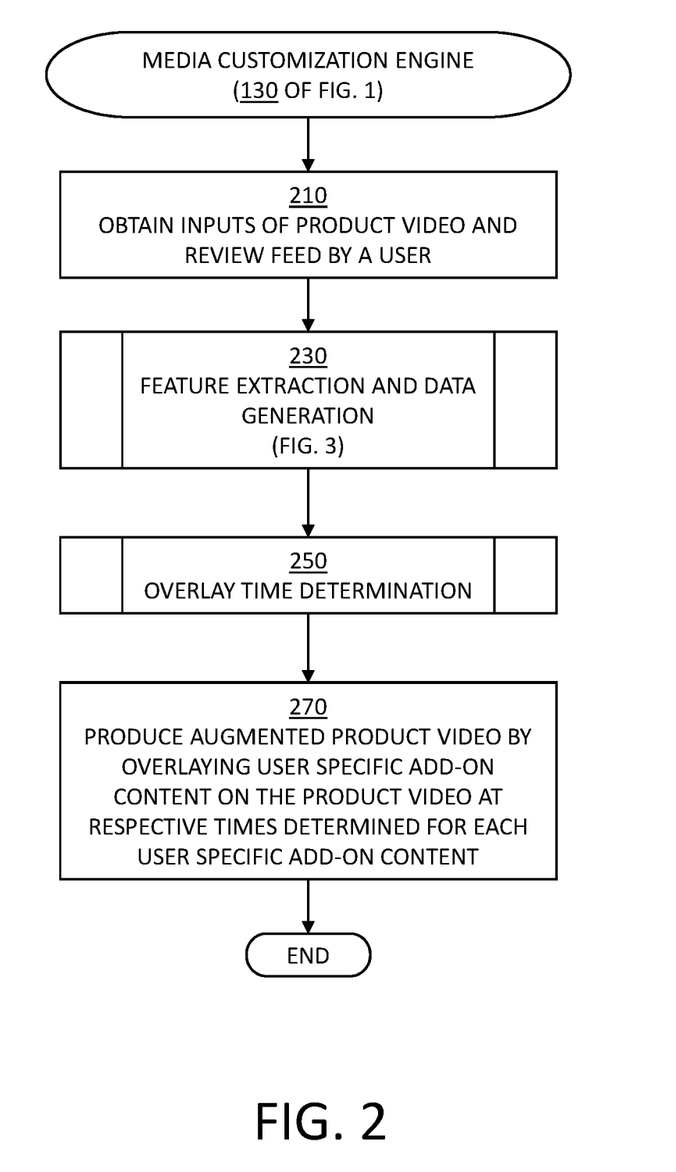
FIG. 2 depicts a flowchart of operations performed by the media customization engine, in accordance with one or more embodiments set forth herein.

FIG. 2 depicts a flowchart of operations performed by the media customization engine 130, in accordance with one or more embodiments set forth herein.

In block 210, the media customization engine 130 obtains inputs of the product video 115 and/or metadata thereof and the review feed 113. The media customization engine 130 may optionally obtain a user profile of the user 101 registering for the media augmentation service, and/or other user profile from social media account, accounts from which the user 101 had posted the review feed 113. Then the media customization engine 130 proceeds with block 230.

In block 230, the media customization engine 130 generates user specific add-on content 160 for the user 101 to overlay on the product video 115 by extracting relevant information from the inputs obtained from block 210.

Figure 3:
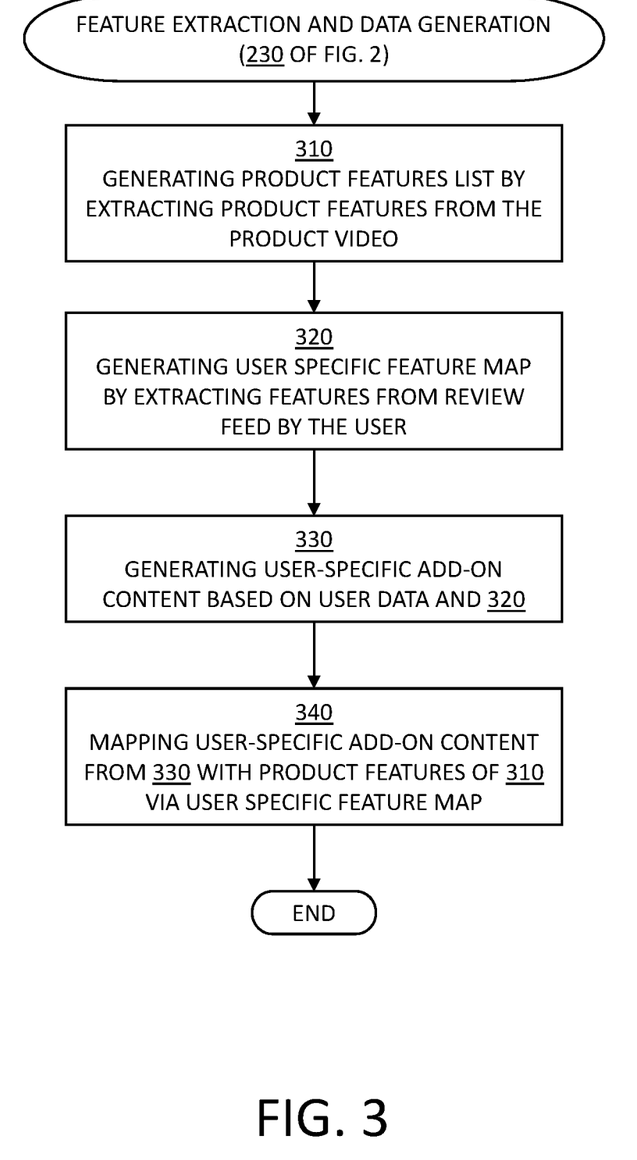
FIG. 3 depicts a flowchart of feature extractions as performed in block 230 of the media customization engine, in accordance with one or more embodiments set forth herein.

Details of block 230 are presented in FIG. 3 and corresponding description. Then the media customization engine 130 proceeds with block 250.

In block 250, the media customization engine 130 determines one or more overlay time when to overlay respective user specific add-on content 160 on the product video 115 to generate the augmented product video 190, based on the user specific feature mappings 150 and other results from block 230. The overlay time may be in a form of a timestamp with minute and second marker in the product video 115. Then the media customization engine 130 proceeds with block 270.

In certain embodiments of the present invention, the media customization engine 130 identifies each overlay time by the respective product feature. More specifically, the media customization engine 130 determines the overlay time corresponding to a timestamp in the product video 115 playing the product feature upon which the review feed 113 had been unfavorable/negative/critical by the user 101, or amongst a group of users to which the user 101 may be included.

In the exemplary review feed 113 of FIG. 1, the battery configuration and the price of the Model X phone had been criticized, and accordingly, the media customization engine 130 identifies the respective timestamps from the product video 115 upon which battery configuration/performance and the price of the Model X phone respectively begins. User specific add-on content on battery performance/improvements, such as Model Y phone with a more advanced battery than the Model X phone, is set to begin when the product video 115 playback is addressing battery feature. Similarly, user specific add-on content on price, such as more economic brands and less expensive model phones than the Model X phone by the Brand A, is set to begin when the product video 115 playback is addressing the price of the Model X phone.

In certain embodiments of the present invention, the media customization engine 130 overlays the user specific add-on content 160 upon ascertaining that the user 101 is playing the product video 115 longer than a threshold total playtime, or a threshold number of plays such that the user 101 is presented with the user specific add-on content 160 only when the user 101 is interested in the product presented in the product video 115.

In certain embodiments of the present invention, the media customization engine 130 identifies each overlay time by the respective product features in order to add in complementary/substitute products, based on the input of the product video 115, automatically generated captions of the product video 115, and the identified defect-feature pairs. The media customization engine 130 utilizes an available audio-to-text tool for generating captions from the product video 115, and/or metadata of the product video 115, as the input for determining the overlay time of the user specific add-on content. The media customization engine 130 scans the captions/subtitles for a semantic match with the defect-feature pairs, and sets respective overlay time for each match discovered.

In one example of the augmented product video 190, a feature F1 is set at T1 point of the product video 115, which would overlay the user specific add-on content 160 relevant to the feature F1 on the product video 115. When the exemplary review feed of FIG. 1 had been posted by the user 101 who is watching a product video 115 promoting a new smartphone, the media customization engine 130 extracts, for example, features of batteries, expandable storage, and price point from both the product video 115 and the exemplary review feed, generates add-on content for the user 101 based on features addressing the issues commented by the user 101 in the review feed 113, and overlay add-on content for the user 101 when the product video 115 plays features for which the user specific add-on content has been generated. For example, while the user 101 watches the augmented product video 190, when the playback position reaches the T1 point, that is where improved battery is pitched in the product video 115, the augmented product video 190 overlays the user specific add-on content 160 relevant to the feature F1, that is, battery of the new smartphone, according to preconfigured display mode, including overlapping on top of the product video 115, as a side tab, alternative display, or the like.

In block 270, the media customization engine 130 produces the augmented product video 190 by overlaying the user specific add-on content 160 on the product video 115 at respective overlay times for each user specific add-on content, as determined in block 250. The media customization engine 130 presents the augmented product video 190 to the user 101, and optionally receive a feedback on the augmented product video 190. Then the media customization engine 130 terminates processing. Alternatively, the media customization engine 130 may loop back to block 210 to obtain updated inputs and to repeat the unit of blocks 210, 230, 250, and 270. The media customization engine 130 also may run the unit of blocks 210, 230, 250, and 270 periodically according to preset schedules.

FIG. 3 depicts a flowchart of feature extractions as performed in block 230 of the media customization engine 130, in accordance with one or more embodiments set forth herein.

In blocks 310 through 340, the media customization engine 130 correlates inputs from block 210, including the product video 115, the review feed 113, and optionally a user profile, based on common features and relevancies of the respective inputs.

In block 310, the media customization engine 130 extracts a product and features supported for the product from the product video 115, by analyzing metadata of the product video 115, by semantically analyzing the script of the product video 115 as converted from the audio stream of the product video 115, or by analyzing objects in snapshot images of the product video 115 at certain intervals. The metadata of the product video may include, but are not limited to, the title, captions, subtitles, and/or tickers of the product video 115. In certain embodiments of the present invention, the media customization engine 130 extracts the product features by topic modeling. The media customization engine 130 stores the extracted product features in the product feature list 140. Then the media customization engine 130 proceeds with block 320.

In certain embodiments of the present invention, the media customization engine 130 utilizes the semantic analysis tools 170 such as dialogue analytics, as well as speech-to-text tools, which are commercially or otherwise readily available.

In block 320, the media customization engine 130 extracts features of the product in which the user 101 is interested based on the review feed 113 posted by the user 101, a user profile of the user 101 for the media augmentation service and other forum/website accounts. The media customization engine 130 also optionally classifies the features based on whether the user 101 had expressed favorably for the product feature or if the user 101 had criticized the product feature. The media customization engine 130 stores the resulting product features in which the user had expressed interest, and the type of interest, that is, either critical or favorable, in the user specific feature map 150. Then the media customization engine 130 proceeds with block 330.

In certain embodiments of the present invention, the media customization engine 130 can optionally compensate a lack of the user profile or other insufficiency of user data in extracting the user specific features with features addressed by other users. In the same embodiment, the media customization engine 130 has user profiles of hundreds of other users available, even though the user profile for the use 101 is not available. The media customization engine 130 can identify a user cluster for the user 101 and, if the user 101 demonstrated a substantially similar pattern of viewing activities with other users in the same user cluster, utilizes a representative user profile for the user cluster as a substitute user profile for the user 101. Examples of viewing activities to determined membership to the user cluster may include, but are not limited to, the number of hours/frequencies watching video contents, additional maneuvers while viewing such push back or forward, the kind of contents preferred, and combinations thereof.

The media customization engine 130 may utilize a neural network, more specifically, a deep learning based neural network framework to determine vector representation of unfavorable/negative/critical user reviews and subsequently to classify such critical reviews, as in product defects, performance issues, safety concerns, and/or functionality issues associated with the product, and optionally to rank the critical reviews according to a preconfigured order. As a result, the media customization engine 130 classifies review feeds commenting on similar issues together under a same classifier/label. The media customization engine 130 can also order the review feeds according to respective recentness, public agreement, user preference, and/or any preconfigured standard within a cluster of review feeds under the same classifier, and select the review feeds from the top of the rank.

In the same embodiment of the present invention, where the media customization engine 130 represents the review feed 113 with fixed-length vector, the media customization engine 130 utilizes a neural network based classifier to identify if the review feed presents a question seeking more information from others, or is a pair of feature-defect statement.

The neural network based classification process is trained with a limited number of preconfigured classifiers/labels by machine learning in order to efficiently classify the review feeds for the purpose of the media customization engine 130.

In the same embodiment, the media customization engine 130 takes two review feeds, in respective semantic representations that comment on respective defect-feature pairs as an input for clustering. In the same embodiment, the semantic representation utilized by the media customization engine 130 is a vector form. The media customization engine 130 subsequently calculates a score quantifying semantic similarity between the defect-feature pairs addressed in the two respective semantic representations from the input, and clusters the two semantic representations together upon ascertaining that the score measuring the semantic similarity indicates a similarity greater than a threshold for forming a defect-feature cluster. The media customization engine 130 can utilize natural language tools measuring semantic similarity of sentences that are presently available, commercially or otherwise. In other embodiments of the present invention, the media customization engine 130 groups together the semantic representations in a vector space using k-means clustering or hierarchical clustering, resulting in a list of defect-feature clusters.

In order to select a specific feature from each cluster, the media customization engine 130 utilizes one or more information extraction tool that facilitates extraction of a most informative defect-feature pairs. The one or more information extraction tool is coupled to the media augmentation system 120, or otherwise made available to the media augmentation system 120.

In block 330, the media customization engine 130 generates the user specific add-on content 160 based on both user data and the user specific feature map 150 generated from block 320. The user data include, but are not limited to, the user profile for the media augmentation service, and any other online account profiles, purchase histories and spending habits applicable for the product presented in the product video 115. Examples of the use specific add-on content 160 include, but are not limited to, complementary/substitute product other than the product presented in the product video 115 which has a feature distinctive from the product feature which the user 101 had criticized, such as a long-lasting battery and/or a replaceable battery configuration, or a less expensive models that compensates the product features criticized by the user 101 in the exemplary review feed 113 from FIG. 1 description. Then the media customization engine 130 proceeds with block 340.

In block 340, the media customization engine 130 ascertains and correlates respective product features of the product video 115 with corresponding user specific add-on content 160 resulting from block 330 by use of the user specific feature map 150 from block 320. The media customization engine 130 would overlay a particular user specific add-on content onto the product video 115 when the playback position of the product video 115 coincides with the product feature correlated with the particular user specific add-on content. Then the media customization engine 130 proceeds with block 250 of FIG. 2.

In certain embodiments of the present invention, the media customization engine 130 derives the product associated with the product video 115 as well as the product features 140 represented in the product video 115. In determining the product and the product features 115, the media customization engine 130 analyzes the product video metadata, including the title and the caption/subtitle of the product video 115. In certain embodiments of the present invention, the media customization engine 130 may derive the list of product features 140 by use of commercially available natural language analysis tools for analyzing the audio stream of the product video 115. In this specification, the term "product feature" indicates various functional, design, and commercial aspects of the product.

In certain embodiments of the present invention, the media customization engine 130 analyzes the review feed 113 by the user 101, as being associated with the product video 115 for the product or on features comparable with the product features 140, and generates the user specific feature map 150.

In certain embodiments of the present invention, the media customization engine 130 compiles a personalized list of substitute products based on a user profile, which includes product features in which the user 101 is interested. If the media customization engine 130 discovers a match between the product features extracted from the product video 115 and the features from the user profile, then the substitute products including the feature may be augment the product video 115. For example, if the product video 115 is on a vehicle, and the user profile indicates the user is interested in a self-driving feature, then the media customization engine 130 includes vehicles with various types of self-driving features in the user specific add-on content 160.

In certain embodiments of the present invention, the media customization engine 130 may count the number of replays/visits in order to determine how much the user 101 is interested in the product, and include related products in the user specific add-on content 160 to produce the augmented product video 190.

Figure 4:
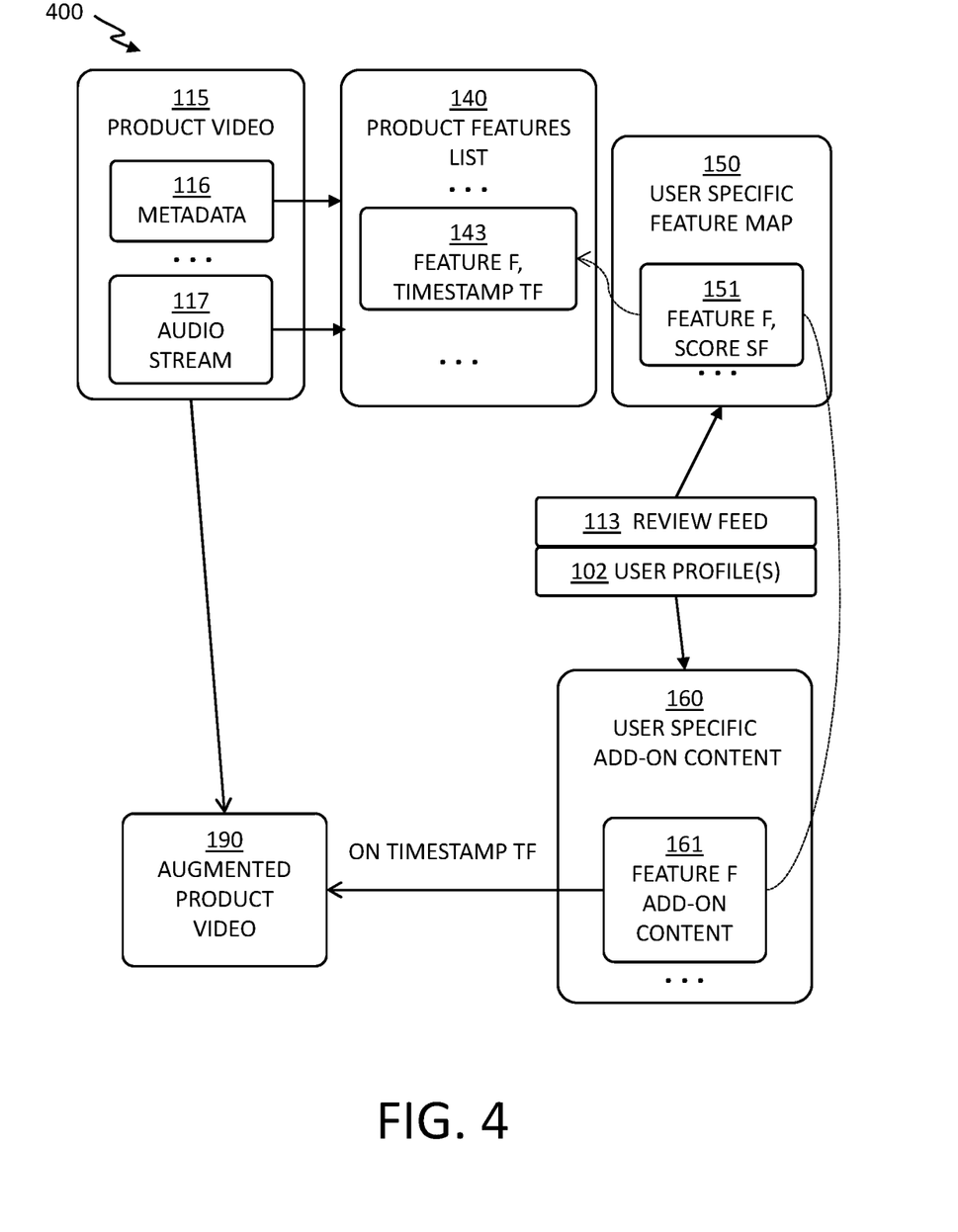
FIG. 4 depicts interrelationship amongst data elements of the media augmentation system, in accordance with one or more embodiments set forth herein.

FIG. 4 depicts interrelationship amongst data elements of the media augmentation system 400, in accordance with one or more embodiments set forth herein.

The data elements of the media augmentation system 400 include inputs of the review feed 113, the product video 115, and one or more user profile 102. The product video 115 includes metadata 116 and audio stream 117. The media customization engine 130 develops a text corresponding to the audio stream 117 by use of speech-to-text tool, auto-scripting tool, or any other natural language analysis tool. Subsequently the media customization engine 130 analyzes texts of the metadata 116 and the text derived from the audio stream 117. In certain embodiments of the present invention, the media customization engine 130 also utilizes video analysis-image recognition tools to capture the objects and texts from the images of the product video 115, in order to extract features of the product represented in the product video 115.

The media customization engine 130 extracts features of the product represented in the product video 115 by semantically analyzing any component/aspect of the product video 115 that can be converted into semantic representation, including but not limited to, the metadata 116 and the text derived from the audio stream 117. The media customization engine 130 pairs each extracted feature with a timestamp on the product video 115 when the extracted feature begins in the product video 115. The media customization engine 130 subsequently generates the product features list 140 with one or more pair of feature and corresponding timestamp, as shown in a product feature entry 143, (Feature F, Timestamp TF).

As noted, the media customization engine 130 extracts features from the review feed 113, by use of semantic representation for sentences from the review feed 113 and semantics analysis. As a result the media customization engine 130 generates the user specific feature map 150 including a user specific feature entry 151, (Feature F, Score SF), where the Feature F identifies the feature and Score SF quantifies how the user 101 evaluate the Feature F. The user specific feature entry 151 may be a defect-feature pair, depending on the implementation, in which case more than one entry may correspond to the same feature, such as (Feature x, Defect 1), . . . , (Feature x, Defect d).

The media customization engine 130 analyzes the one or more user profile 102 and, for the features in the user specific feature map 150 as identified from the review feed 113, the media customization engine 130 generates respective add-on content corresponding to each feature. The media customization engine 130 subsequently associates Feature F add-on content 161 corresponding to the user specific feature entry 151 of Feature F.

The media customization engine 130 searches a feature entry from product features list 140 that corresponds to the user specific feature entry 151 (Feature F) from the user specific feature map 150. If the media customization engine 130 discovers a product feature entry 143 (Feature F, Timestamp TF) corresponding to the user specific feature entry 151 (Feature F) of the user specific feature map 150, then the media customization engine 130 generates the augmented product video 190 by overlaying the Feature F add-on content 161 to begin at time position of Timestamp TF of the product video 115. In cases when the media customization engine 130 does not discover corresponding entries in the product features list 140 and the user specific feature map 150, then the media customization engine 130 does not overlay user specific add-on content 160 because the product video 115 does not include any feature similar to the features that the user 101 had commented.

Certain embodiments of the present invention may offer various technical computing advantages, including the use of neural networks to comprehensively and efficiently extracting and classifying features of product from the product video and user specific features in which the user is interested, as expressed in the review feed. Product features from the product video are timestamped and the product features are mapped with the user specific features for a particular user. User specific add-on content is automatically generated based on the review feed and user data and overlaid at the time position corresponding to the timestamp of the product feature that is presented. Certain embodiments of the present invention may be further applied to cognitively analyzing any multimedia content with a theme, and the personalized add-on may be overlaid at the moment a certain issue is presented in the original multimedia content.

Certain embodiments of the present invention utilizes data mining in order to generate a comprehensive list of feature in which a particular user is interested, and to compile user-specific add-on content introducing products and/or features complementing or substituting the product and/or feature of the product video. Also the features are semantically analyzed, classified and clustered to categorically identify features in which the user is and might be interested, and what type of features and products may be proper add-on based on user preferences, purchase history and spending habits. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The media augmentation-customization service may be provided for subscribed business entities in need from any location in the world.

Figure 5:
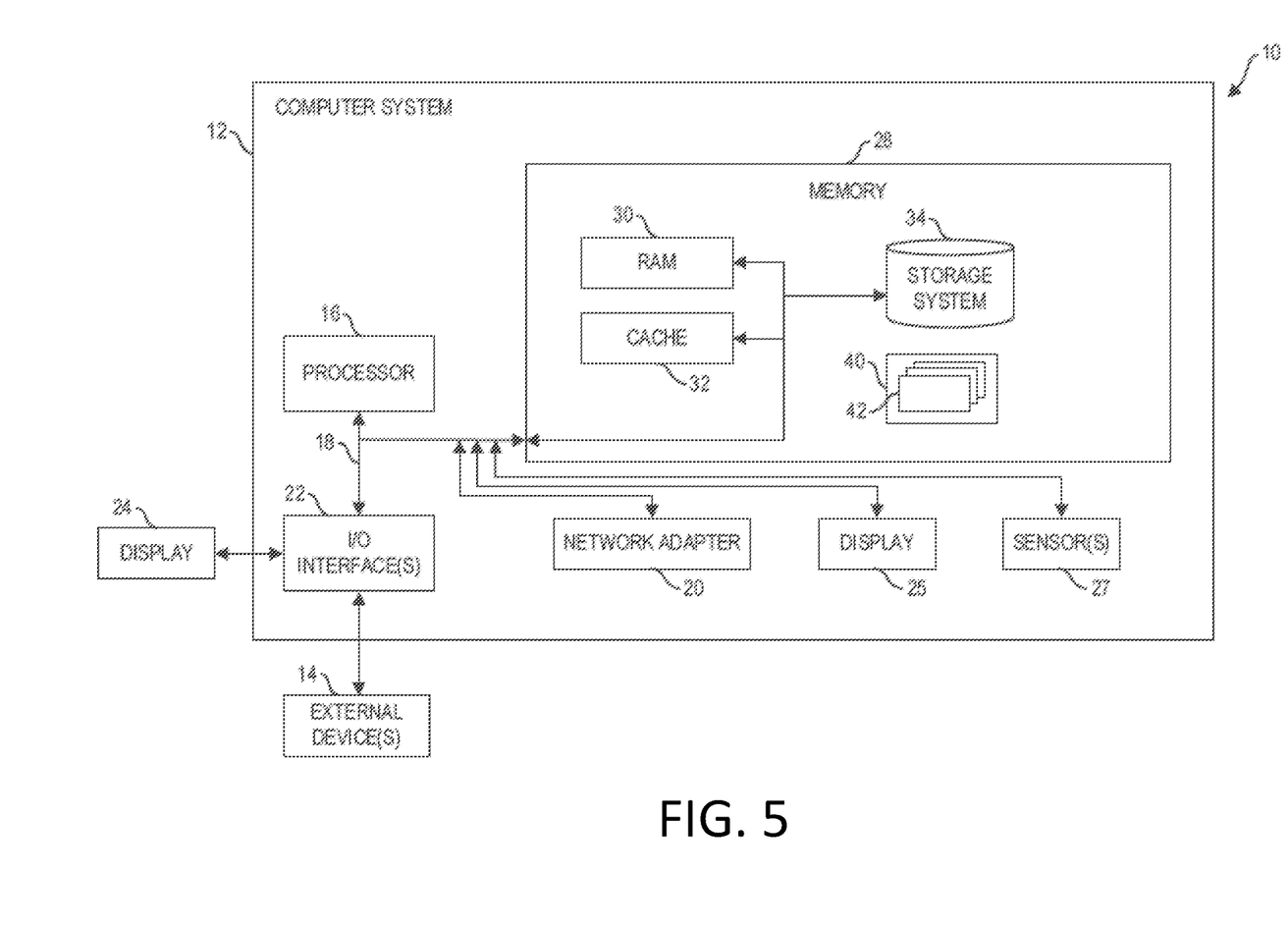
FIG. 5 depicts a cloud computing node according to an embodiment of the present invention.
Figure 6:
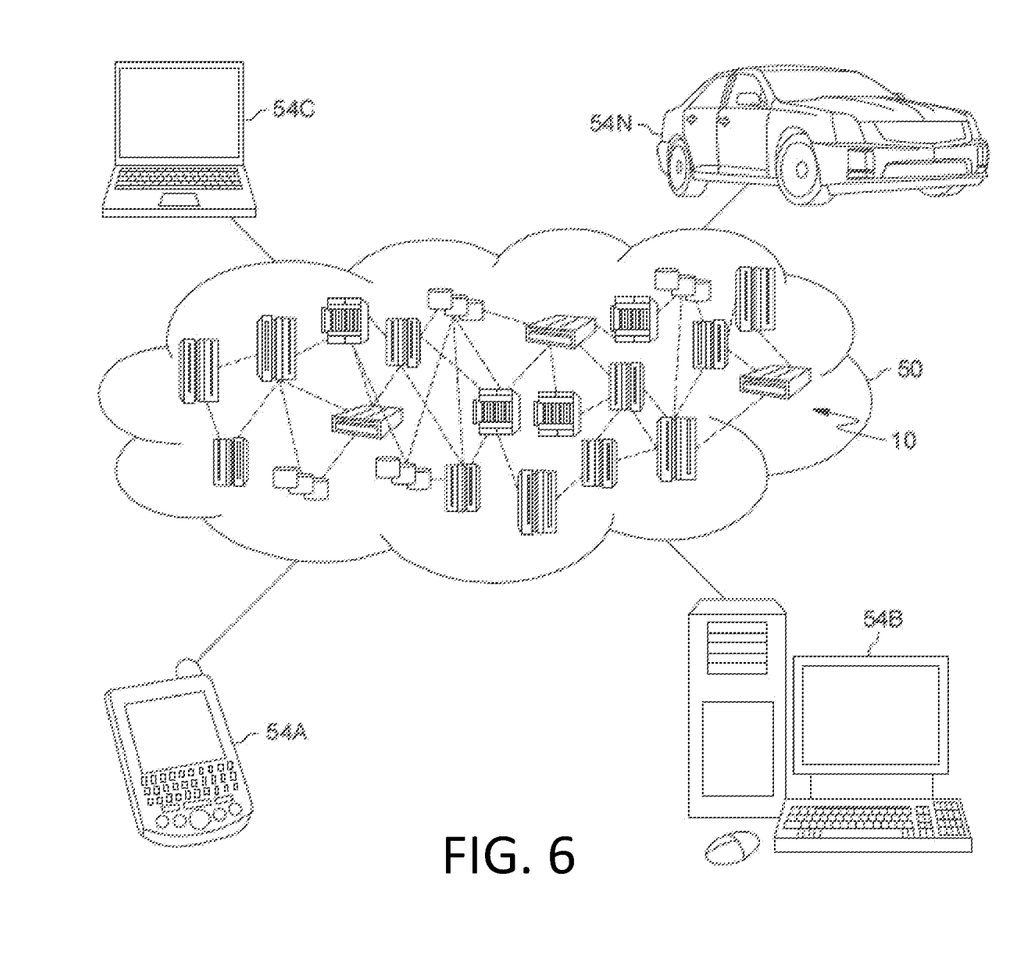
FIG. 6 depicts a cloud computing environment according to an embodiment of the present invention.
Figure 7:
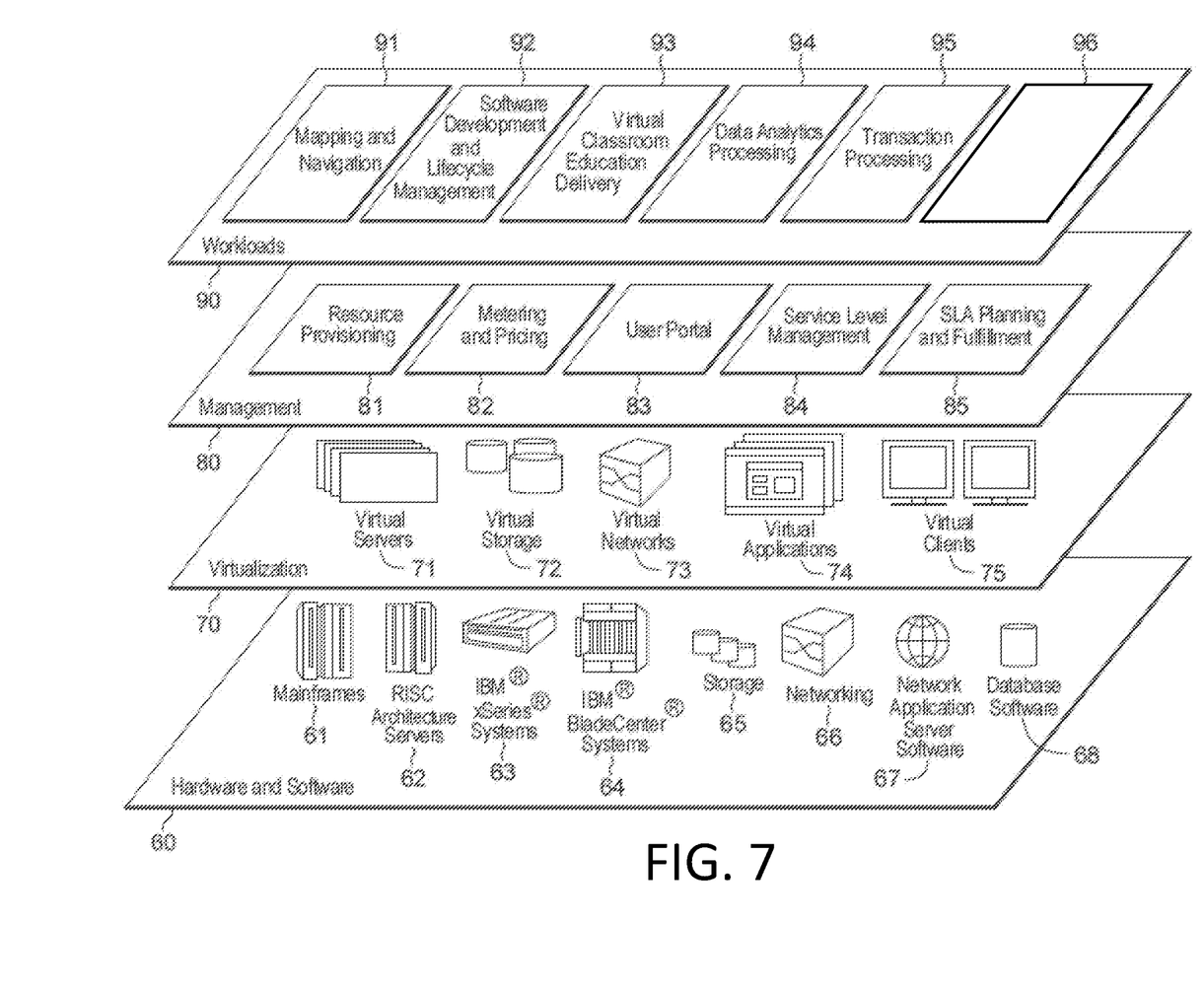
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the style emulation engine 130 and the stylized NLG system 120 of FIG. 1, respectively. Program processes 42, as in the media customization engine 130 of the media augmentation system 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 that runs the media customization engine may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the media augmentation services as provided by the media augmentation system 96, as described herein.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for automatically augmenting a product video, comprising:
    obtaining, by one or more processor, the product video representing a product and one or more review feed authored by a user, wherein the user is watching the product video;
    generating, by the one or more processor, a list of product features presented in the product video;
    creating, by the one or more processor, a user specific feature map of features addressed in the one or more review feed;
    producing, by the one or more processor, user specific add-on content corresponding to respective user specific features based on one or more user profile of the user;
    determining, by the one or more processor, a time to overlay a first user specific add-on content on the product video according to a user specific feature corresponding to the first user specific add-on content, wherein the user specific feature is mapped to a product feature in the list of product features; and
    presenting, by the one or more processor, an augmented product video to the user by overlaying the first user specific add-on content on the product video at the time to overlay.

2. The computer implemented method of claim 1, the generating comprising:
    extracting the product features from the product video by semantically analyzing metadata of the product video and texts derived from the product video; and
    storing the product features from the extracting in the list of product features, accompanied by respective timestamps of each product feature indicating when the product features respectively begin playing in the product video.

3. The computer implemented method of claim 1, the creating comprising;
    extracting the features from the one or more review feed by semantically analyzing vector representation of each sentence in the one or more review feed by the user;
    calculating respective scores corresponding to the features from the extracting, wherein each score quantifies how the user evaluates a corresponding feature amongst the features; and
    storing respective entries of the features from the extracting in the user specific feature map, wherein an entry of the user specific feature map comprises a feature and a score corresponding to the feature from the calculating.

4. The computer implemented method of claim 3, further comprising:
    rendering vector representations of each sentence in the one or more review feed by use of a neural network;
    classifying the vector representations from the rendering; and
    clustering two (2) or more vector representations in a vector space using k-means clustering or hierarchical clustering, resulting in a list of defect-feature clusters.

5. The computer implemented method of claim 4, further comprising:
    storing the list of defect-feature clusters as the user specific feature map; and
    identifying a product feature in the product video by searching the list of product features for a feature in the list of defect-feature clusters.

6. The computer implemented method of claim 1, the producing comprising:
    determining a user preference on a certain feature in the user specific feature map based on analyzing the review feed and one or more user profile concerning the user;
    identifying zero (0) or more complementary product, zero (0) or more substitute product, or a combination thereof, for the product according to the user preference; and
    formulating content respective to any product from the identifying.

7. The computer implemented method of claim 1, the determining comprising:
    discovering, from the list of product features presented in the product video, a product feature that is identical to a first user specific feature corresponding to the first user specific add-on content; and
    setting the time to overlay the first user specific add-on content on the product video as a timestamp corresponding to the product feature in the list of product features.

8. A computer program product comprising:
    a computer readable storage medium readable by one or more processor and storing instructions for execution by the one or more processor for performing a method for automatically augmenting a product video, comprising:
        obtaining the product video representing a product and one or more review feed authored by a user, wherein the user is watching the product video;
        generating a list of product features presented in the product video;
        creating a user specific feature map of features addressed in the one or more review feed;
        producing user specific add-on content corresponding to respective user specific features based on one or more user profile of the user;

determining a time to overlay a first user specific add-on content on the product video according to a user specific feature corresponding to the first user specific add-on content, wherein the user specific feature is mapped to a product feature in the list of product features; and presenting an augmented product video to the user by overlaying the first user specific add-on content on the product video at the time to overlay.

9. The computer program product of claim 8, the generating comprising:

extracting the product features from the product video by semantically analyzing metadata of the product video and texts derived from the product video; and storing the product features from the extracting in the list of product features, accompanied by respective timestamps of each product feature indicating when the product features respectively begin playing in the product video.

10. The computer program product of claim 8, the creating comprising;

extracting the features from the one or more review feed by semantically analyzing vector representation of each sentence in the one or more review feed by the user;

calculating respective scores corresponding to the features from the extracting, wherein each score quantifies how the user evaluates a corresponding feature amongst the features; and storing respective entries of the features from the extracting in the user specific feature map, wherein an entry of the user specific feature map comprises a feature and a score corresponding to the feature from the calculating.

11. The computer program product of claim 10, further comprising:

rendering vector representations of each sentence in the one or more review feed by use of a neural network;

classifying the vector representations from the rendering; and clustering two (2) or more vector representations in a vector space using k-means clustering or hierarchical clustering, resulting in a list of defect-feature clusters.

12. The computer program product of claim 11, further comprising:

storing the list of defect-feature clusters as the user specific feature map; and identifying a product feature in the product video by searching the list of product features for a feature in the list of defect-feature clusters.

13. The computer program product of claim 8, the producing comprising:

determining a user preference on a certain feature in the user specific feature map based on analyzing the review feed and one or more user profile concerning the user;

identifying zero (0) or more complementary product, zero (0) or more substitute product, or a combination thereof, for the product according to the user preference; and formulating content respective to any product from the identifying.

14. The computer program product of claim 8, the determining comprising:

discovering, from the list of product features presented in the product video, a product feature that is identical to a first user specific feature corresponding to the first user specific add-on content; and setting the time to overlay the first user specific add-on content on the product video as a timestamp corresponding to the product feature in the list of product features.

15. A system comprising:

a memory;

one or more processor in communication with memory; and program instructions executable by the one or more processor via the memory to perform a method for automatically augmenting a product video, comprising:

obtaining the product video representing a product and one or more review feed authored by a user, wherein the user is watching the product video;

generating a list of product features presented in the product video;

creating a user specific feature map of features addressed in the one or more review feed;

producing user specific add-on content corresponding to respective user specific features based on one or more user profile of the user;

determining a time to overlay a first user specific add-on content on the product video according to a user specific feature corresponding to the first user specific add-on content, wherein the user specific feature is mapped to a product feature in the list of product features; and presenting an augmented product video to the user by overlaying the first user specific add-on content on the product video at the time to overlay.

16. The system of claim 15, the generating comprising:

extracting the product features from the product video by semantically analyzing metadata of the product video and texts derived from the product video; and storing the product features from the extracting in the list of product features, accompanied by respective timestamps of each product feature indicating when the product features respectively begin playing in the product video.

17. The system of claim 15, the creating comprising;

extracting the features from the one or more review feed by semantically analyzing vector representation of each sentence in the one or more review feed by the user;

calculating respective scores corresponding to the features from the extracting, wherein each score quantifies how the user evaluates a corresponding feature amongst the features; and storing respective entries of the features from the extracting in the user specific feature map, wherein an entry of the user specific feature map comprises a feature and a score corresponding to the feature from the calculating.

18. The system of claim 17, further comprising:

rendering vector representations of each sentence in the one or more review feed by use of a neural network;

classifying the vector representations from the rendering; and clustering two (2) or more vector representations in a vector space using k-means clustering or hierarchical clustering, resulting in a list of defect-feature clusters.

19. The system of claim 15, the producing comprising:

determining a user preference on a certain feature in the user specific feature map based on analyzing the review feed and one or more user profile concerning the user;

identifying zero (0) or more complementary product, zero (0) or more substitute product, or a combination thereof, for the product according to the user preference; and formulating content respective to any product from the identifying.

20. The system of claim 15, the determining comprising:
discovering, from the list of product features presented in the product video, a product feature that is identical to a first user specific feature corresponding to the first user specific add-on content; and
setting the time to overlay the first user specific add-on content on the product video as a timestamp corresponding to the product feature in the list of product features.

\* \* \* \* \*